Nov. 12, 1957  C. E. FINKS  2,813,265
STORAGE BATTERY ENERGIZED SIGNAL LAMP FOR MOTOR VEHICLES
Filed Jan. 20, 1956

INVENTOR
*Charles E. Finks*

BY *W. S. Rambo*

ATTORNEY

United States Patent Office 2,813,265
Patented Nov. 12, 1957

2,813,265
STORAGE BATTERY ENERGIZED SIGNAL LAMP FOR MOTOR VEHICLES

Charles Earl Finks, Hilliards, Ohio
Application January 20, 1956, Serial No. 560,310
1 Claim. (Cl. 340—366)

This invention relates to signal lamps of the portable self-contained type adapted for use in connection with motor vehicles, especially trucks, for placement on road or highway surfaces as visual warning signals when such vehicles are parked on or at the side of a highway.

In the past, such signal lamps have employed dry batteries to energize light-emitting bulbs, or have been provided with extension cords adapted for connection with conventional storage battery-energized lamp circuits in supplying the bulbs thereof with operating current. Dry batteries often have a comparatively short operating life, and the use of extension cords limits the lamps in their field of placement, as well as constituting a severe current drain on the associated storage batteries of motor vehicles used generally for engine starting for headlamp operation and other current-consuming accessories.

It is, therefore, an object of the invention to provide an independently usable signal lamp having a casing in which is contained a bulb-energizing storage battery, whereby to provide a signal lamp having an extended operating life for each period of use thereof, together with freedom in obtaining desired placement of the lamp in selected and most advantageous working positions with respect to an associated parked motor vehicle.

Another important object of the present invention is to provide, in combination with such a storage battery-containing signal lamp, an improved means for detachably supporting the lamp upon a motor vehicle when the lamp is not in active use, said supporting means including elements of interfitting plug and socket means which are connected with the generator output circuit of the motor vehicle and formed for electrical engagement with complemental storage battery terminals, whereby when the lamp is mounted on said support the battery contained therein may be charged to maintain the battery in an effective operative condition following demounting of the lamp from said support.

A further object is to provide a road-placed signal lamp for motor vehicles which embodies an elongated, battery-containing casing adapted for upright placement on a road or highway surface, and wherein the bottom of the casing is weighted and formed to possess a rounded, semi-spherical formation and by which the casing, when tilted to one side or the other, turns on its weighted and rounded bottom portion, so that when forces tending to tilt the same are removed, the casing will assume automatically its normal upright position.

Still a further object is to provide a signal lamp of this character having a battery energized light bulb encased in a transparent dome mounted on the top of the aforesaid casing, which dome includes a suitable reflector system which is arranged so as to concentrate light rays emanating from the bulb and project the same generally horizontally or laterally outwardly from the transparent dome, whereby to produce issuing light beams of a strong, far-reaching character which are capable of being readily seen by approaching motorists and identified as a warning or danger signal.

An additional object is to provide a sturdy, simple, and efficient signal lamp incorporating structure for attaining the above and other objects, and wherein the bulb-energizing circuit thereof is provided with an automatic thermostatic switch which intermittently opens and closes the circuit containing the same to impart flashing illumination on the part of the lamp.

Another object is to provide the lamp casing with an internally positioned switch for controlling the opening and closing of the light bulb-energizing circuit, said switch including a spring-pressed operating plunger which normally closes the bulb circuits and projects through the casing to the exterior thereof, whereby when the signal lamp is mounted on its vehicle-carried supporting means, the outer end of the plunger will, through its engagement with the supporting means, hold the switch in a position opening the bulb circuit, so that the bulb will not be energized when the lamp is inactively positioned on the supporting means.

For a further understanding of the invention, reference may now be had to the following detailed description of a presently preferred embodiment of the invention and the accompanying drawing illustrating the same, wherein.

Figure 1:
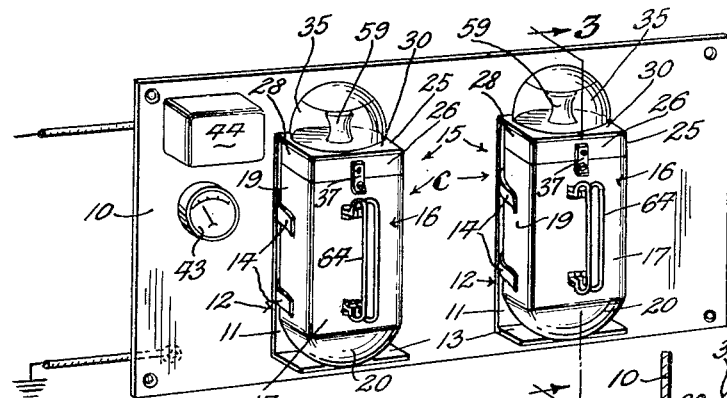
Fig. 1 is a perspective view disclosing a pair of signal lamps formed in accordance with the present invention when mounted in holders provided therefor on a supporting panel of a motor vehicle.
Figure 2:
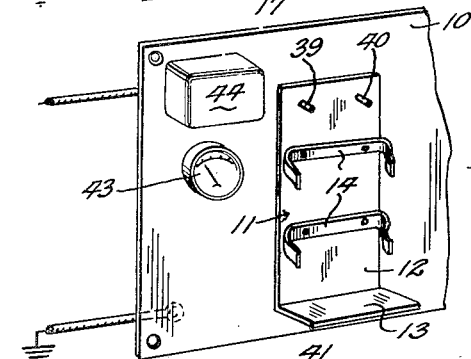
Fig. 2 is a fragmentary perspective view of a portion of said panel and one of said holders with an associated signal lamp removed therefrom.
Figure 3:
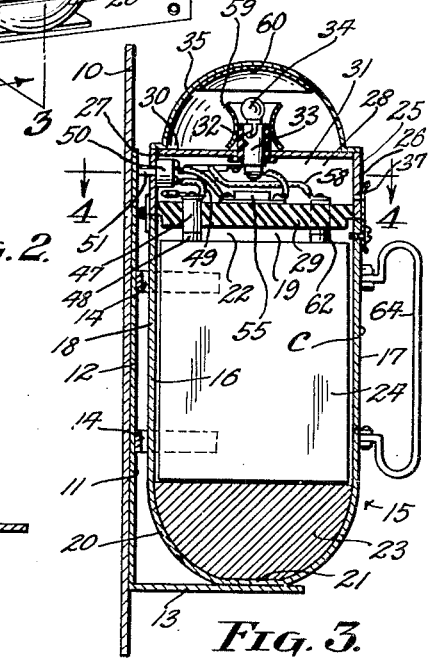
Fig. 3 is a vertical sectional view taken through the lamp and its supporting means, the plane of the figure being indicated by the line 3—3 of Fig. 1.

Referring more particularly to the drawings, the numeral 10 designates a backing panel or plate adapted to be disposed in an accessible location within the cab or other suitable location of a motor vehicle. On the panel there is mounted, in spaced vertical order, a pair of lamp-holding brackets 11. In this instance, each bracket includes a vertical leg 12 and a shorter, horizontally and outwardly extending leg 13 at the bottom thereof. Also, each vertical leg carries a pair of vertically spaced, horizontally disposed, resilient clamps 14 for positively embracing, but removably retaining in an applied supported position on each bracket, a battery-containing signal lamp 15 formed in accordance with the present invention.

Each of these lamps is formed to comprise generally an elongated substantially cubical casing C, having a body section 16 produced by the employment of vertical front, back, and side walls 17, 18, and 19, respectively, the walls terminating at the lower part of the casing in a rounded semispherical bottom 20. The latter is preferably formed with a small, flattened, circular base region 21 disposed for base surface engagement and to contact the horizontal leg 13 of an associated bracket when the lamp is retained on said bracket in mounted association with the backing plate or panel 10.

Each casing provides through its wall formation an internal chamber 22 which is closed at the bottom thereof and openable at its top. The bottom of each chamber has stationarily mounted therein a member 23 composed of a suitable body of weighting metal. This weight-providing body functions in conjunction with the rounded bottom of the casing to restore the lamp, when the same is positioned on a road or highway surface, to its normal upright position following lateral tilting thereof, especially in the event the lamp should for any reason be accidentally rocked over from its side. Also, positioned in the internal compartment of each casing, and resting on the flat, horizontally disposed, upper surface thereof, is a bulb-energizing, wet cell, storage battery 24.

The upper end of each casing is normally closed by a movable top closure 25. Each of these closures embodies vertically disposed, front, back, and side walls 26, 27, and 28, respectively, which are normally disposed in vertical alignment with the complemental walls 17, 18, and 19 of the main body section 16 of the casing. Each closure includes a horizontal bottom wall 29 of a suitable dielectric material and a top wall 30. These walls of each closure define an internal compartment 31.

Each top wall 30 carries centrally thereof an upright insulating sleeve 32 in which is positioned a socket element 33 formed at its upper end for the replaceable reception of an ordinary incandescent light bulb 34. Also, removably positioned on the top wall 30 is a hollow, semi-spherical dome 35 of glass, synthetic plastic or other transparent material. The dome preferably is colored to transmit a red-tinted light when the associated bulb 34 therein is energized.

In this instance, the lower edge of the back wall 27 of each closure is hinged at 36 to the upper edge portion of the back wall 18 of the body section, so that the closure may be raised in providing access, when necessary, to the battery-containing chamber 22 of the body section. At the front end thereof the closure carries a resilient catch 37 to hold the closure against casual movement.

Figure 4:
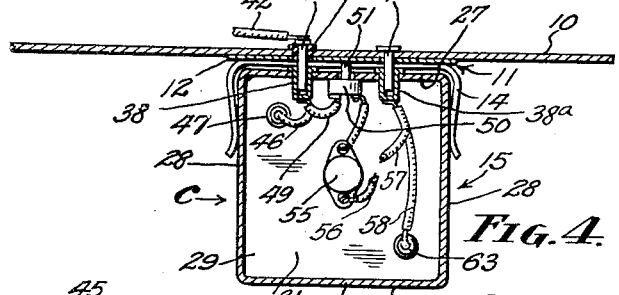
Fig. 4 is a horizontal sectional view through the lamp and its supporting means on the plane indicated by the line 4—4 of Fig. 3.
Figure 5:
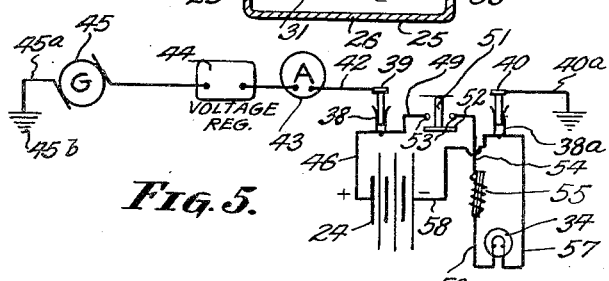
Fig. 5 is a wiring diagram of the battery-charging and bulb-energizing circuits of the apparatus of the present invention.

As shown more particularly in Figs. 4 and 5, the back wall 27 of each closure 25 carries a pair of spaced socket members 38 and 38a which, when the lamp employing the same is carried by the plate 10 and an associated bracket 11, will receive, respectively, terminal jacks or plugs 39 and 40. The plug 39 is shown as being mounted in a plate-carried insulating bushing 41, and as illustrated in Fig. 5, the plug 39 is connected by conductor means 42 with a conventional plate-mounted ammeter 43 and a voltage regulator 44, the conductor means extending from the regulator 44 to a conventional engine-driven generator 45 of a motor vehicle electrical system. Another conductor 46 extends from the socket member 38 within the closure compartment 31 to a terminal post 47 stationarily mounted in the bottom wall 29 of each closure, which post, when the closure is shut, has its lower end disposed in electrical contact with a cooperative terminal 48 carried by and projecting upwardly from the battery 24.

Still another conductor 49 extends from the socket member 38 to a bulb-energizing switch 50 carried by the back wall 27 of each closure and arranged within the compartment 28. The switch 50 includes a spring-biased plunger 51 which, when a signal lamp is operatively held in connection with its bracket 12, engages, as shown in Fig. 4, the vertical leg 12 of the bracket 11 to hold the switch in a circuit-opening position in which the bridge 52 on the plunger 51 is held spaced from the contacts 53, so that the bulb 34 will remain deenergized.

From one of the contacts 53, a line 54 extends to a bimetallic-type flasher switch 55 which is positioned on the upper surface of the bottom wall 29 of each closure and which, when the operating circuit of the bulb 34 is closed by the operation of the spring-biased switch 50, is alternately opened and closed to produce intermittent energization of the bulb 34 and a flashing signal. The flasher switch is connected by a line 56 to the bulb socket 33, and another line 57 extends from the bulb socket to the line 58 to the battery 24. The plug 40 is joined with a ground line 40a to complete the battery-charging circuit.

Figure 6:
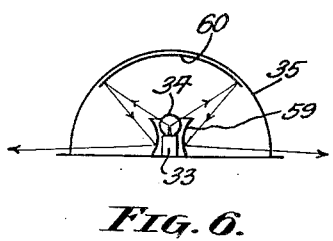
Fig. 6 is a diagrammatic view of a light reflector system used in conjunction with the light bulb of my improved lamp.

The sleeve 32 is surrounded by a venturi-shaped shield reflector 59 which directs light rays emanating from the bulb 34 in a generally upward direction for impingement upon the polished surfaces of a downwardly facing, concave reflector 60 positioned within the upper part of the dome 35. As shown in Fig. 6, light reflected downwardly from the reflector 60 strikes the polished outer surfaces of the shield 59 and is diffused outwardly and laterally through the transparent, light-emitting areas of the dome 35.

From the foregoing, it will be seen that when the lamps 15 occupy their mounted positions on the panel or plate 10, the battery 24 of each lamp will be charged and maintained at full capacity by current obtained from the generator 45 and controlled by the voltage regulator 44. The charging circuit comprises the generator 45, source line 42, the plug or jack construction 38 and 39, the line 46, the post 47, and the battery terminal 48. The return from the charging circuit includes the battery terminal 62, terminal rod 63 of the bottom plate 29, the line 58, the jack or plug construction 38a and 40, and ground line 40a, the opposite terminal 45a of the generator being likewise grounded at 45b. Thus, while the lamps are not in use, the same are constantly joined with the generator circuit to assure a fully charged condition at all times in the batteries 24.

When one or both of the lamps are removed from the mounting panel or plate 10 for use as a signalling means, the switch 51 thereof, which was held open by the engagement of its plunger 51 with the panel 10 when the lamp was plate-mounted, automatically closes to complete the bulb-energizing circuit. The bulb circuit comprises the positive terminal 48 of the battery 24, the post 47, conductor 46, conductor 49, the closed switch 50, conductor 54, flasher switch 55, line 56, light bulb 34, line 57, and line 58 to the return terminal 62 of the battery 24.

The lamps are equipped with handles 64 by which the same may be held, the handles enabling a user to readily carry the lamps when demounted from the plate or panel 10, so that the lamps may be positioned on a roadway in desired positions to provide a self-contained operating unit. The light emitted through the transparent side of the dome 35 provides a clear, flashing, danger signal capable of being readily discerned by approaching vehicle drivers. Also, due to the rounded and weighted lower end of the lamp casing, the lamp restores itself to and maintains an upright position if it should be struck by a force causing the same to tilt to positions angular to its normal upright axis.

I claim:

In combination with a motor vehicle having an electrical system including a generator; a lamp-receiving and supporting bracket stationarily secured to said vehicle in a position of ready access and including resilient lamp-clamping means, quick detachable electrical connector means adjacent said lamp-clamping means, and a voltage regulator carried on said bracket and electrically connected between said last-named connector means and the generator of said vehicle independently of the usual electrical system of such vehicle; and a portable lamp arranged to be bodily connected to and disconnected from the lamp-clamping means of said bracket, said lamp including a self-contained, chargeable storage battery, an incandescent light bulb connected to be energized by said battery, second electrical connector means electrically connected with said battery and arranged for detachable electrical engagement with the electrical connector means of said bracket when said lamp is engaged with said lamp-clamping means, and a normally closed switch element carried by said lamp and connected in series between said battery and said light bulb and having an actuating member arranged to open said switch automatically upon engagement of said lamp with said bracket.

References Cited in the file of this patent

UNITED STATES PATENTS

| | | |
|---|---|---|
| 1,469,783 | Essington | Oct. 9, 1923 |
| 2,233,377 | Talbot | Feb. 25, 1941 |
| 2,263,518 | Riner | Nov. 18, 1941 |
| 2,375,866 | Nelms et al. | May 15, 1945 |
| 2,582,330 | Hautala | Jan. 15, 1952 |
| 2,677,752 | Kaiser | May 4, 1954 |